(12) United States Patent
Kerg et al.

(10) Patent No.: US 6,672,561 B2
(45) Date of Patent: Jan. 6, 2004

(54) PISTON DIAPHRAGM WITH INTEGRAL SEAL

(75) Inventors: David Kerg, Fairview Park, OH (US); Michael R. Whaley, Akron, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 10/225,020

(22) Filed: Aug. 21, 2002

(65) Prior Publication Data

US 2003/0183789 A1 Oct. 2, 2003

Related U.S. Application Data

(63) Continuation-in-part of application No. 10/109,413, filed on Mar. 28, 2002.

(51) Int. Cl.[7] .............................................. F16K 31/122
(52) U.S. Cl. ................... 251/63.5; 251/331; 251/335.2
(58) Field of Search ................ 251/331, 63.5, 251/335.2

(56) References Cited

U.S. PATENT DOCUMENTS

| | | | |
|---|---|---|---|
| 1,954,192 A | 4/1934 | Biggs | |
| 3,612,621 A | 10/1971 | Scott | |
| 3,717,170 A | 2/1973 | McRae | |
| 3,777,777 A | 12/1973 | Katchka | |
| 3,838,707 A | 10/1974 | Wachowitz, Jr. | |
| 3,884,260 A | 5/1975 | Hilgert | |
| 3,905,382 A | 9/1975 | Waterston | |
| 3,978,881 A | 9/1976 | Mouranie | |
| 4,072,165 A | 2/1978 | Bradley, Jr. | |
| 4,166,606 A | 9/1979 | Kawolics et al. | |
| 4,187,870 A | 2/1980 | Akkerman | |
| 4,262,697 A | 4/1981 | Davis | |
| 4,337,807 A | 7/1982 | Piet | |
| 4,596,271 A | 6/1986 | Brundage | |
| 4,694,849 A | 9/1987 | Rampen | |
| 4,836,236 A * | 6/1989 | Ladisch | 251/331 X |
| 4,898,393 A | 2/1990 | Rollins | |
| 4,901,751 A | 2/1990 | Story et al. | |
| 5,002,086 A | 3/1991 | Linder et al. | |
| 5,067,522 A | 11/1991 | Ligh | |
| 5,076,320 A | 12/1991 | Robinson | |
| 5,150,883 A | 9/1992 | Cook-Martin | |
| 5,261,442 A | 11/1993 | Kingsford et al. | |
| 5,549,134 A | 8/1996 | Browne et al. | |
| 5,590,680 A | 1/1997 | Gugala et al. | |
| 5,954,086 A * | 9/1999 | Ronchi | 251/63.5 X |
| 6,394,417 B1 | 5/2002 | Browne et al. | |

* cited by examiner

Primary Examiner—Kevin Lee
(74) Attorney, Agent, or Firm—Calfee, Halter & Griswold LLP

(57) ABSTRACT

A radial diaphragm valve includes a diaphragm having an elongated stem that is threadably or otherwise installed on an actuator piston. The elongated stem is slideably received in a bore formed in the actuator housing, and includes a circumferential recess that receives a seal. The seal provides a backup seal function separating the process fluid from the interior region of the actuator.

15 Claims, 1 Drawing Sheet

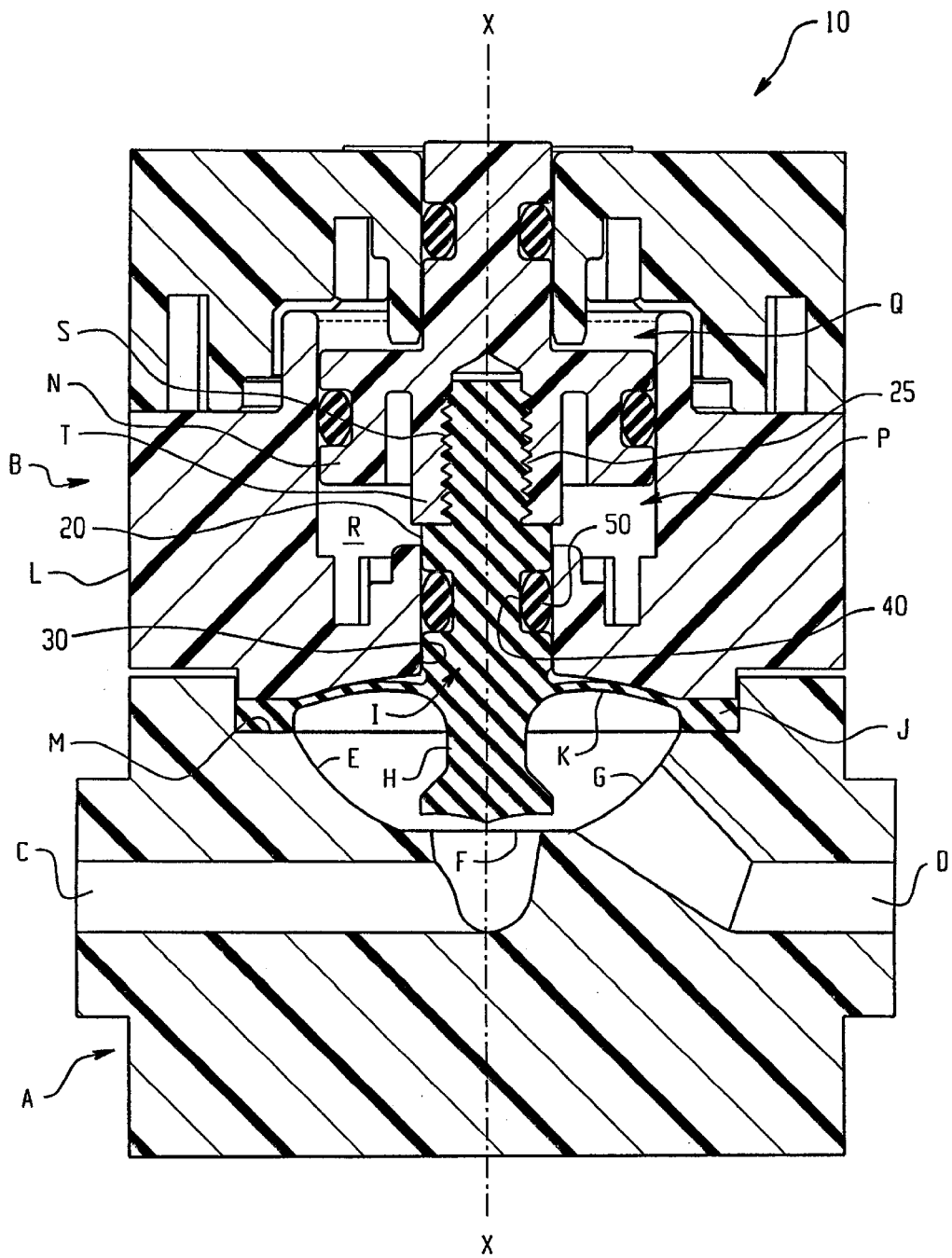

PISTON DIAPHRAGM WITH INTEGRAL SEAL

RELATED APPLICATIONS

This application is a continuation-in-part of pending U.S. patent application Ser. No. 10/109,413 filed on Mar. 28, 2002 for SANITARY DIAPHRAGM VALVE, the entire disclosure of which is fully incorporated herein by reference.

BACKGROUND OF THE INVENTION

As the need for sanitary valves continues to increase for industries such as semiconductor and biopharmaceutical, radial diaphragm valves are being recognized as highly effective for increased flow, cleanability and low contamination. One such valve is disclosed in U.S. Pat. No. 6,394,417 B1 owned by the assignee of the present invention, the entire disclosure of which is fully incorporated herein by reference. The present invention is directed to additional design options of such a valve.

SUMMARY OF THE INVENTION

In accordance with one aspect of the invention, an alternative design to seal a valve actuator piston and diaphragm is provided. In a preferred embodiment of the invention, the diaphragm includes an elongated stem that is threadably or otherwise installed on an actuator piston. The elongated stem is slideably received in a bore formed in the actuator housing, and includes a circumferential recess that receives a seal. The seal provides a backup seal function separating the process fluid from the interior region of the actuator. In a non-manual actuator the seal separates a pressurized portion of the actuator from the diaphragm. The seal may also function as a guide to facilitate alignment of the diaphragm. In one specific but not required embodiment the seal is an o-ring.

These and other aspects and advantages of the present invention will be apparent to those skilled in the art from the following description of the preferred embodiments in view of the accompanying drawings.

BRIEF DESCRIPTION OF THE DRAWING

The drawing is a radial diaphragm valve illustrated in longitudinal cross-section in accordance with the invention.

DETAILED DESCRIPTION OF THE INVENTION

With reference to the drawing, a radial diaphragm valve 10 in accordance with the invention is illustrated. Many of the features of the valve are similar to the above noted patent and need not be repeated herein. Reference to such patent may be made for a detailed understanding of these common features. Moreover, while the invention is described herein with respect to an exemplary embodiment of a plastic radial diaphragm valve, such description should not be construed in a limiting sense. Those skilled in the art will readily appreciate that the invention may be utilized in many different valve designs including but not limited to weir style valves, metal valves and so on to name a few examples.

The valve 10 in this exemplary embodiment includes a valve body A and a valve actuator assembly B mounted thereon by any suitable means such as bolts (not shown). The valve body A includes an inlet C and an outlet D through which the flow of a process fluid, either gas or liquid. The inlet C opens to a valve cavity E at an inlet port F, and the outlet D opens to the valve cavity E at an outlet port G. Fluid flow through the valve is controlled by axial movement of a valve stem H. The valve stem H seals about the inlet port F to close the valve 10. The drawing illustrates the valve 10 in the open position.

The valve stem H is integrally formed with a radial diaphragm I that includes a peripheral rim J and a flexible web K that joins the rim J to the stem H. The rim J is sandwiched between an actuator body L and a counterbore M formed in the valve body A. The rim J thus forms a body seal to prevent the loss of process fluid from the valve cavity.

The actuator assembly B in this example is an air actuator, however, other actuator devices and technologies may be alternatively used including but not limited to manual actuators or hydraulic actuators. The actuator assembly B includes an actuator piston N that is slideably received in a piston chamber P. The piston N divides the piston chamber P into an upper section Q and a lower section R. The piston N is translated along the main longitudinal axis X by controlling the pressure differential between the upper and lower sections Q and R, as is known. The piston N includes a central female threaded bore S formed in an actuator stem T. In the exemplary embodiment, the actuator B is of the type that is generally known as a double acting actuator, meaning that air pressure is used to both open and close the valve. Alternatively, a bias element such as a spring (not shown) is appropriately mounted in the actuator to provide either a normally closed valve (the valve is biased closed by the spring) or a normally open valve, as is well known in the art.

In accordance with the invention, the diaphragm I includes an upper diaphragm stem portion 20 that, by comparison to the stem in the above incorporated patent, is axially lengthened and extends through and is slideably received in a central bore 30 formed in the actuator body L. The elongated stem 20 includes a male threaded end 25 that threadably mates with the threaded bore S formed in the piston N. Although the diaphragm I is illustrated as being threadably mated with the piston N, those skilled in the art will appreciate that other techniques may be conveniently used to join the parts. In accordance with one aspect of the invention, the diaphragm I may be made of a suitable plastic material such as, for example, PTFE (TEFLON™) or other lubricious -material, thus reducing or eliminating the need for a lubricant between the bore 30 and the upper stem 20.

A circumferential groove 40 is formed in the diaphragm upper stem portion 20 at an axial position such that the groove 40 is substantially contained within the central bore 30 over the entire stroke of the piston N. A seal 50, in this example an o-ring, is received in the upper stem portion groove 40. This seal 50 will prevent process fluid from passing into the actuator assembly B in the event that the diaphragm I seal is compromised. In the case where there is fluid pressure in the lower section R of the piston chamber P (for example, in a normally open air actuated valve or a double acting actuator), the seal 50 also isolates this pressure from the diaphragm I.

Still further, the seal 50 functions to journal and guide the diaphragm stem 20 within the actuator housing bore 30. This helps to maintain the diaphragm I in proper alignment for optimum sealing of the inlet port F, particularly when the diaphragm I is installed on the actuator stem T by a bayonet or a floating mount arrangement or other non-threaded mounting arrangement (not shown).

The invention has been described with reference to the preferred embodiments. Clearly, modifications and alterations will occur to others upon a reading and understanding of this specification. It is intended to include all such modifications and alterations insofar as they come within the scope of the appended claims or the equivalents thereof.

Having described the invention, we claim:

1. In a radial diaphragm valve of the type having a valve body having a valve cavity therein, a diaphragm having a perimeter that seals the valve cavity, a first fluid passage in the valve body that opens to the valve cavity and a second fluid passage in the valve body that opens to the valve cavity; the diaphragm having a central diaphragm stem that opens and closes the valve such that the diaphragm stem is movable between a valve open and valve closed position along an axis; and an actuator for moving the diaphragm stem to open and close the valve, the improvement comprising:
   a groove formed in the diaphragm stem and a seal received in said groove.

2. The valve of claim 1 wherein said seal comprises an o-ring.

3. The valve of claim 1 comprising an actuator stem coupled with said diaphragm stem.

4. The valve of claim 1 wherein said seal prevents fluid from the valve cavity from passing into the actuator when the diaphragm seal is compromised.

5. The valve of claim 1 comprising an actuator housing having a bore therein that slideably receives a portion of said diaphragm stem, said seal being positioned within said bore for the entire stroke of the diaphragm stem.

6. The valve of claim 5 wherein said seal journals and guides said diaphragm stem in said bore, thereby facilitating alignment of diaphragm.

7. The valve of claim 1 wherein the diaphragm comprises a lubricious polymeric material.

8. The valve of claim 6 wherein the diaphragm comprises PTFE.

9. The valve of claim 1 wherein the actuator comprises an air actuator.

10. In a radial diaphragm valve of the type having a valve body having a valve cavity therein, a diaphragm having a perimeter that seals the valve cavity; a first fluid passage in the valve body that opens to the valve cavity and a second fluid passage in the valve body that opens to the valve cavity; the diaphragm having a central diaphragm stem that opens and closes the valve such that the diaphragm stem is movable between a valve open and valve closed position along an axis; and an actuator for moving the diaphragm stem to open and close the valve, the improvement comprising:
   a backup seal located between a diaphragm seal and an actuator piston, wherein said backup seal prevents process fluid from contact with said actuator piston, when the diaphragm seal is compromised.

11. The valve of claim 10, wherein said backup seal is an o-ring received in a groove on the diaphragm stem.

12. In a radial diaphragm valve of the type having a valve body having a valve cavity therein, a diaphragm having a perimeter that seals the valve cavity; a first fluid passage in the valve body that opens to the valve cavity and a second fluid passage in the valve body that opens to the valve cavity; the diaphragm having a central diaphragm stem that opens and closes the valve such that the diaphragm stem is movable between a valve open and valve closed position along an axis; and an actuator for moving the diaphragm stem to open and close the valve, the improvement comprising:
   a seal disposed on the diaphragm stem wherein said seal journals and guides the diaphragm stem in the bore, thereby facilitating alignment of said diaphragms.

13. In a radial diaphragm valve of the type having a valve body having a valve cavity therein, a diaphragm having a perimeter that seals the valve cavity; a first fluid passage in the valve body that opens to the valve cavity and a second fluid passage in the valve body that opens to the valve cavity; the diaphragm having a central diaphragm stem that opens and closes the valve such that the diaphragm stem is movable between a valve open and valve closed position along an axis; and an actuator for moving the diaphragm stem to open and close the valve, the improvement comprising:
   a groove formed in the diaphragm stem and a seal received in said groove, wherein said seal aligns the diaphragm stem independently from the alignment of the actuator.

14. In a radial diaphragm valve of the type having a valve body having a valve cavity therein, a diaphragm having a perimeter that seals the valve cavity; a first fluid passage in the valve body that opens to the valve cavity and a second fluid passage in the valve body that opens to the valve cavity; the diaphragm having a central diaphragm stem that opens and closes the valve such that the diaphragm stem is movable between a valve open and valve closed position along an axis; and an actuator for moving the diaphragm stem to open and close the valve, the improvement comprising:
   a groove formed in the diaphragm stem and a seal received in said groove, wherein said seal is located such that if the diaphragm seal is compromised, process fluid will only be exposed to inert matter.

15. The valve of claim 14, where said inert matter is PTFE.

* * * * *

UNITED STATES PATENT AND TRADEMARK OFFICE
CERTIFICATE OF CORRECTION

PATENT NO. : 6,672,561 B2  Page 1 of 1
DATED : January 6, 2004
INVENTOR(S) : David Kerg et al.

It is certified that error appears in the above-identified patent and that said Letters Patent is hereby corrected as shown below:

Column 2,
Line 44, please delete "lubricious-material" and insert -- lubricious material --.

Column 3,
Line 8, please delete "cavity," and insert -- cavity; --.

Column 4,
Line 17, please delete "diaphragms" and insert -- diaphragm --.

Signed and Sealed this

Fifteenth Day of June, 2004

JON W. DUDAS
*Acting Director of the United States Patent and Trademark Office*